UNITED STATES PATENT OFFICE.

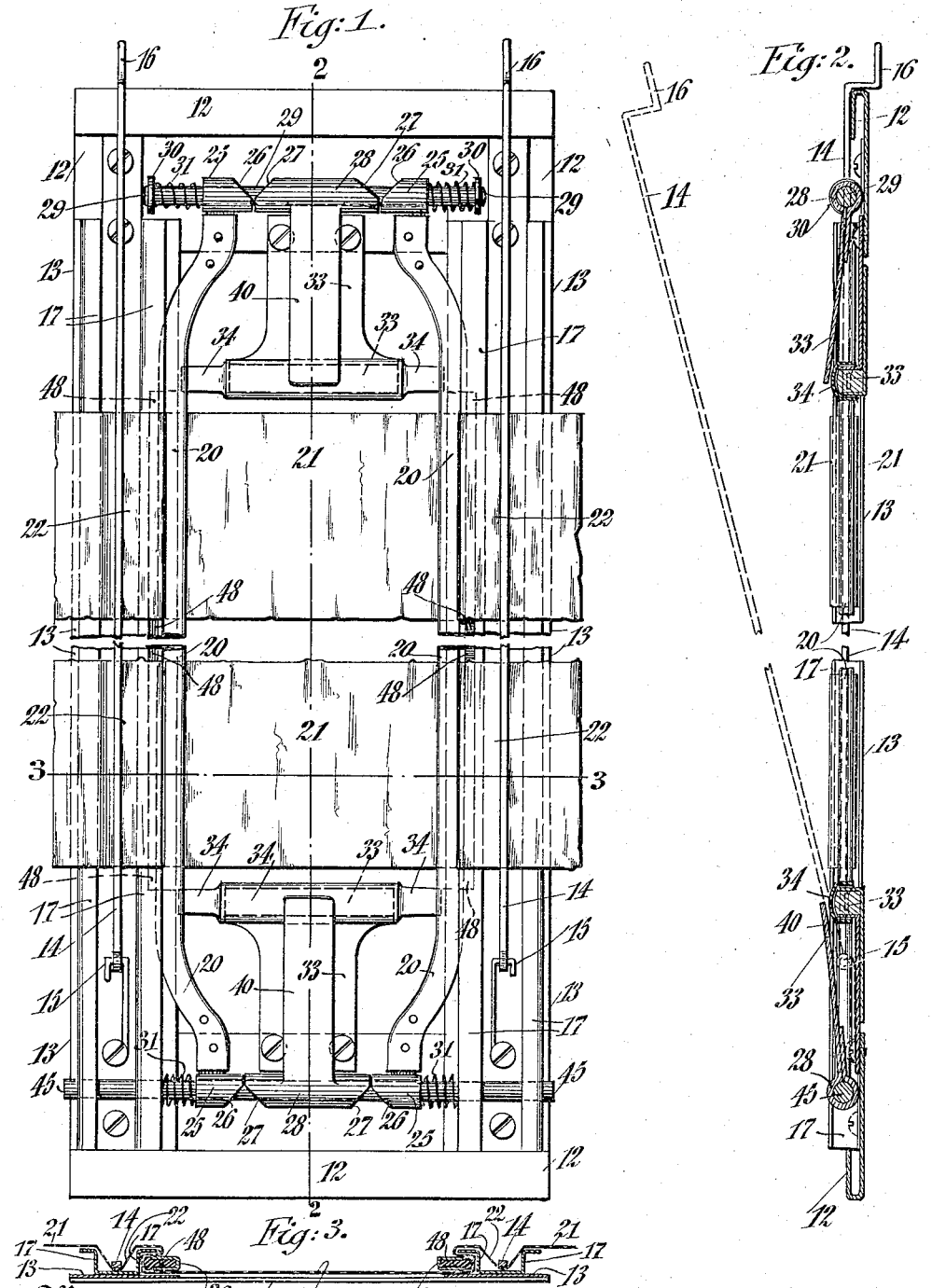

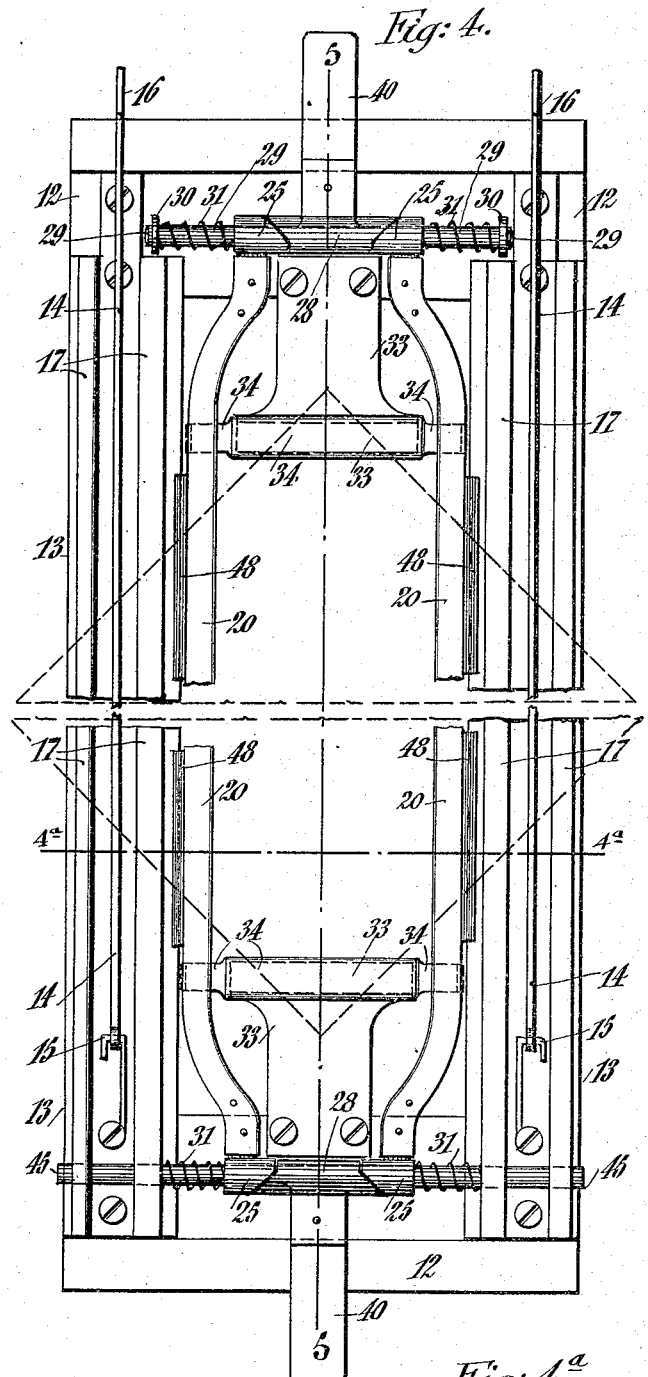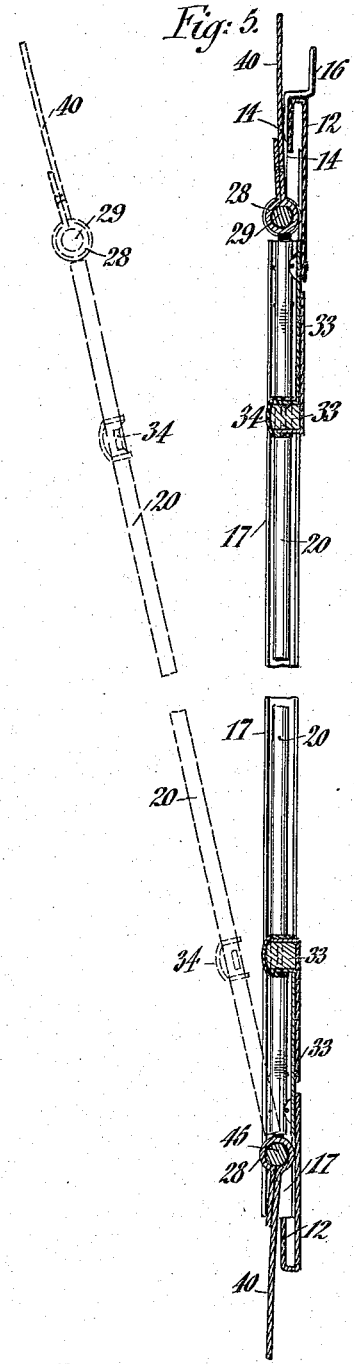

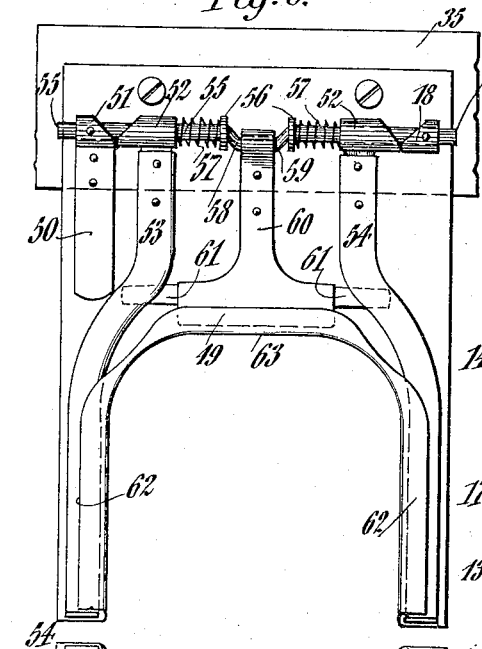

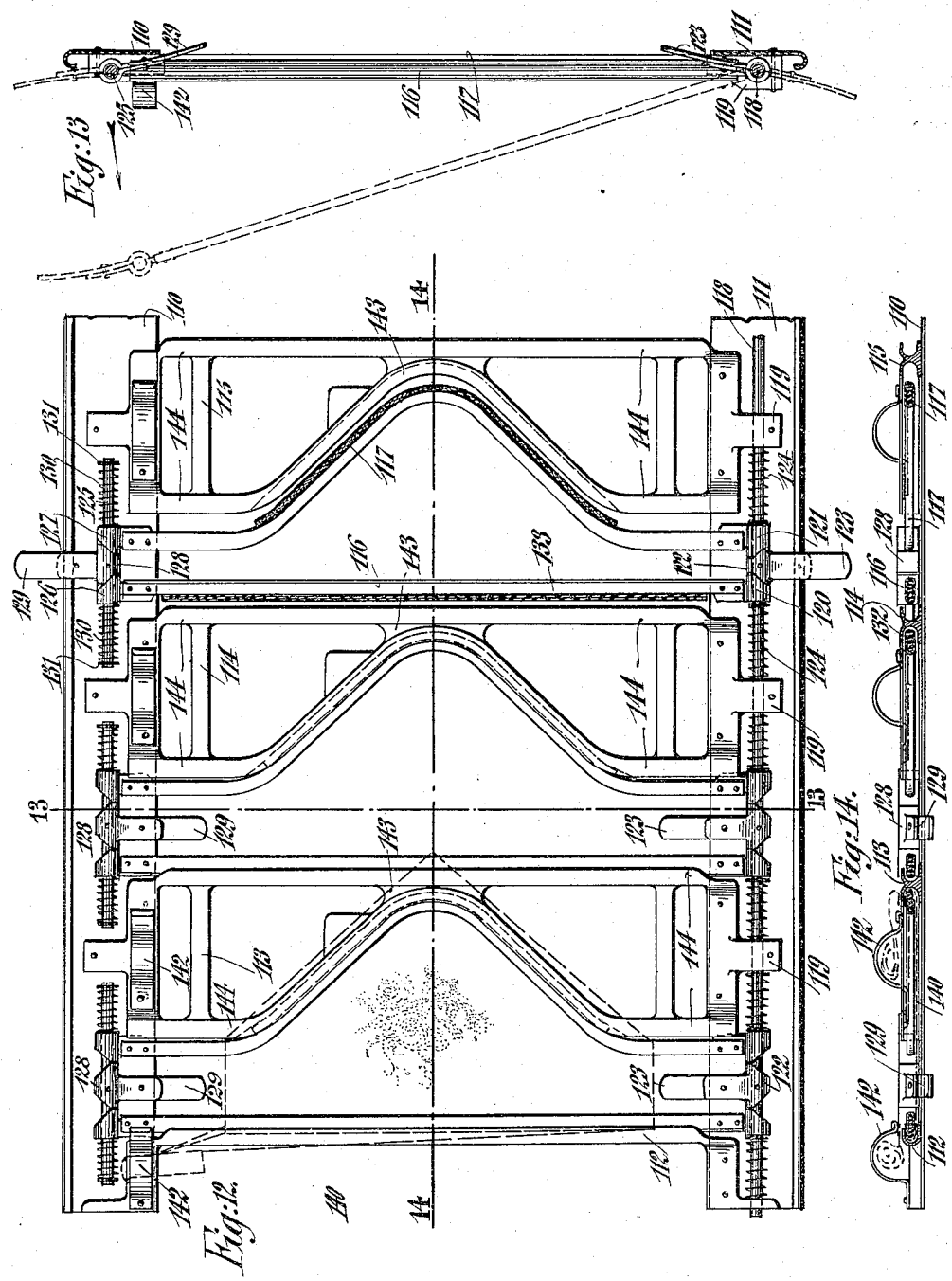

JOSEPH ROSCHACH, OF CAMPGAW, NEW JERSEY.

EMBROIDERY-FRAME.

1,167,933.  Specification of Letters Patent.  Patented Jan. 11, 1916.

Application filed June 22, 1914. Serial No. 846,548.

*To all whom it may concern:*

Be it known that I, JOSEPH ROSCHACH, a citizen of the Republic of Switzerland, and a resident of Campgaw, in the county of Bergen and State of New Jersey, have invented certain new and useful Improvements in Embroidery-Frames, of which the following is a specification.

This invention relates to embroidery frames, and has for its object to provide an improved frame for embroidering handkerchiefs, gloves, stockings, scarfs, etc., which is efficient in operation.

Several embodiments of the invention are shown in the accompanying drawings, and will be more fully described hereinafter and finally pointed out in the claims.

In the accompanying drawing, Figure 1 is a plan view of one embodiment of the invention, Fig. 2 is a longitudinal section on line 2—2 of Fig. 1, Fig. 3 is a transverse section on line 3—3 of Fig. 1, Fig. 4 is a plan view of the device, opened, Fig. 4ª is a transverse section on line 4ª—4ª of Fig. 4, Fig. 5 is a longitudinal section on line 5—5 of Fig. 4, Fig. 6 is a plan view of another embodiment of the invention, Fig. 7 is a transverse section on line 7—7 of Fig. 6, Fig. 8 is a plan view of another embodiment, Fig. 9 shows still another embodiment, Fig. 10 is a section on line 10—10 of Fig. 8, Fig. 11 is a section on line 11—11 of Fig. 9, Fig. 12 is a plan, showing a plurality of embroidery frames, embodying the invention, arranged in series, Fig. 13 is a transverse section on line 13—13, Fig. 12, and Fig. 14 is a longitudinal section on line 14—14, Fig. 12.

Similar character of reference indicate corresponding parts throughout the various figures of the drawing.

Referring to the drawings, and more particularly to Figs. 1 to 3, the frame there shown comprises rails 12 between which extend connecting-members 13, said members 13 are provided with clamping rods 14 hinged at 15, which have manipulating ends 16, whereby they can be placed between side-members 17 which are secured to the members 13, and thereby clamp the material 21 between the rods 14 and the members 17. Between the members 17 at either side of the frame, a stretcher-frame is arranged which consists of movable side bars 20 adapted to engage the fixed members 17 and press between the bars 20 and the members 17 the material 21 to be embroidered. It will be noted that the expanding bars 20 press the material into the members 17, and that also the rods 14 press the material into the members 17. The movable side bars are provided with face strips 48 of rubber, which enter into the U-shaped stationary members 17. Thereby a very secure hold of the material is obtained, and by the rods 14 the outstanding flaps indicated by 22 are prevented from freely moving, and thereby coming into contact with any of the moving parts of the machine. The side bars 20 are moved into expanding position by means of inclined coöperating surfaces, and for this purpose each of the side bars 20 is provided at each end with a bearing member 25 which has at one side thereof, at 26, a beveled face. This beveled face is engaged by a cam 28, which has a bevel 27 at each end thereof. Cam 28 is secured to the shaft 29, and the latter has at each end thereof a head 30. Between the heads 30 and the members 25, springs 31 are arranged. The rail 12 carries an extension 33 which is adapted to be engaged by a clamping member 34 loosely mounted at its ends in the bars 20, for clamping the material between the parts 33 and 34. The construction of the expanding devices at the opposite end of the frame is similar to that already described, except that the cam 28 is loose on its shaft 45 and the latter is secured at its ends in the members 17.

When the handle 40 is raised by the operator, the cam 28 is thereby moved around its axis, and thereby the springs 31 force the members 25 inwardly and carry with them the side bars 20, the coöperating beveled portions 26 and 27 permitting inward movement. Thereby the bars 20 become disengaged from the fixed members 17 and the frame may be opened, the bars 20 swinging on shaft 45 as an axis, into the position shown in dotted lines in Fig. 5, and permitting removal of the material, the rods 14 having been previously opened away from the members 17. By the device described, a very efficient frame is produced, as by the coöperation of the parts the material is firmly held in position for the embroidering to take place by the usual and well-known machines.

In the embodiment shown in Fig. 6, the operating handle 50 is arranged at the side of the frame, and has a beveled hub 51 cooperating with a beveled portion 52, to which beveled portion 52 the movable sidebar 53 is secured. The side-bar 54 is like the bar 53 and operated by a cam 18 on the shaft 55. Intermediate the beveled members 52 and abutments 56 on the shaft are spreading-springs 57. Between the two abutments 56, the shaft is arranged to form a crank-arm, as indicated by 58, and this crank-arm is engaged by a sleeve 59 on a clamping member 60. Member 60 has lateral lugs 61 which are guided in the bars 53 and 54. The construction of the expanding devices at the opposite end of the apparatus is similar to that already described, except that the shaft 36 is mounted at its ends in bearings 37 supported on the frame 63, whereby the outer frame 53, 54 may be swung away from the inner frame 63 for opening the apparatus. By the arrangement described, all the side-bars may be brought into and out of clamping position very rapidly by the action of the handles 50. The side-bars 53 and 54 engage the U-shaped fixed side members 62 of the frame 63, and the clamping members 60 engage the end portions 49 thereof, and thereby clamp in position the material to be embroidered. The frame 63 is secured at its ends to rails 35 for attachment to the embroidery machine.

In the embodiment shown in Fig. 8, the side bars 70 and 71 have sleeves 72 and 73, between which and heads 74 and 75 on the shaft 38, springs 76 are arranged. An expanding device, consisting of two cam-levers 77 and 78 is provided, whereby the bars 70 and 71 are moved into outermost position against the action of the springs 76.

In Fig. 9 another embodiment is shown, in which the movable side bars 80 and 81 have sleeves 82 and 83 pressed away from the fixed members 84 and 85 by springs 86. The sleeves 82 and 83 are secured to pins 88 which are guided in the members 84, 85, and said pins have their inner ends 89 engaged by a cam-plate 90 which is rotatable on a center stud 91. The plate 90 has manipulating knobs 93, whereby the plate may be rotated. When it is arranged with its longest axis in line with the guiding pins 88, it serves to press the pins and thereby the side-bars 80 and 81 outwardly against the action of the springs 86, and thereby clamp the bars 80 and 81 against the inclosing side members 84 and 85. When, however, this plate is rotated to take the position shown in dotted lines in Fig. 9, then the springs 86 cause the bars 80 and 81 to move out of the inclosing side members and permit the material to be removed from the frame.

The frames described or others embodying the same principles may be used singly, but in practice a number of the same are mounted consecutively on the same rails. Such a construction is shown in Figs. 12 to 14 inclusive. Referring to these figures, the rails 110, 111 are of such shape as to readily fit into the embroidery machine. Between the rails are arranged transversely a plurality of fixed or stationary frame members, as, for instance, 112, 113, 114, 115. Said stationary frame members are equidistantly spaced apart. Between each two adjacent fixed frame members is arranged a swinging stretcher frame. Said frame comprises two side-bars 116, 117, one of which is adapted to engage one edge of the fixed member at one side and the other of which is adapted to engage the edge of the member at the other side of the stretcher-frame when the two bars are expanded from each other for clamping the article to be embroidered. At one end each of said side-bars 116, 117 is pivoted to the rail, as, for example, the rail 111, as shown in Figs. 12 and 13. This is accomplished by providing a longitudinal rod 118, which may be secured in lugs 119 at the ends of the fixed frame members. Each side-bar is provided at its pivoted end with a bearing member mounted on the rod 118. The bearing member 120 of the side-bar 116 has its inner face beveled in one direction, and the bearing member 121 of the side-bar 117 has its inner face beveled in the opposite direction. Between said bearing members is an operating cam 122 rotatably mounted on the rod 118, and provided with a handle 123. Springs 124 on the rod 118 between said lugs 119 and the bearing members, press the latter constantly inwardly against the cam 122. At the opposite ends the side-bars 116, 117 are connected by a pin 125 which passes through bearing members 126, 127 and a cam member 128, said bearing members and cam corresponding in their general form to those at the opposite end of the stretcher-frame, and the cam 128 is provided with a corresponding handle 129. Springs 130 between heads 131 on the outer ends of the pin 125 and the bearing members 126, 127 constantly press the bearing members inwardly upon the cam 128. The action of the springs at both ends of the frames tends to move the bars 116 and 117 toward each other throughout their lengths, whereby the stretcher-frame is contracted in width, so that the article to be embroidered may be inserted between said side-bars and the adjacent fixed frame members. For securely holding the article, the fixed members are provided at their edges with concave seats 132 in which are adapted to enter convex rubber facing-strips 133, which are secured to the side-bars. The article to be embroidered having been inserted in the frame when the same is in open condition, as shown at the right-hand side of Fig. 12, the cam-operating handles 123 and 129 are now swung inwardly into the position shown at the left-hand side of Fig. 12. By such operation the cams 122 and 128 are caused to spread apart the bearing members of the side-bars, and thereby the side-bars themselves, into clamping engagement with the stationary frame members 112 and 113, and thereby the article is drawn taut in the frame, the position of the same being indicated in dotted lines 140 in Fig. 12. For securing any loose material which might extend beyond the limits necessary to be clamped for embroidering spring-clips 142 are provided, under which the surplus material may be gathered, as shown in Fig. 14, and thereby held during the embroidering operation.

The fixed frame-members may have any suitable form. In Figs. 12 and 13, the member 112 is a simple transverse bar secured at its ends to the rails 110 and 111. The fixed frame-members are widened at their ends, as shown at 144, and have a contracted middle portion 143 between the same. One edge of the fixed member thus recedes at its middle from the edge of the adjacent member, and forms with the same an approximately triangular space in which the portion of the fabric to be embroidered is located. This construction economizes space and lends strength to the entire apparatus, and has the advantage, when embroidering cornered articles, such as handkerchiefs, that the same may be placed with the corner-portion thereof in said triangular space, as shown in dotted lines in Fig. 12, thus giving a tight clamping action and stretching of the fabric at said portion.

When the embroidering is completed, the operating handles 123 and 129 are moved by the operator outwardly into the position indicated at the right-hand side of Fig. 12, the side-bar-springs retract the side-bars of the stretcher-frame, and the material is thereby freed, so that the same may be removed. For preventing the cams 122 and 128 from being forced in return direction after they have once been swung into inner position, the widest portion of the cam is so located as to be slightly beyond the centers, that is, beyond the widest portions, of the bearing members, when the cam is in inner position. The operating handles 123 and 129 are limited in their inward movement by abutment with the rails 110 and 111, as shown in Fig. 13.

The frame is made of any desired metal or metals. For securing lightness in weight parts of the frame, as for example, the fixed frame-members, may be made of aluminum.

Three frames have been shown in Fig. 12, but any desired number may be used, mounted together in the manner shown, for use in a single machine, and a number of such sections, for example, eight or as many as twenty-six, may be used, according to the capacity of the machine employed.

Several embodiments of the invention have been described. The invention is not limited to these, and changes may be made therein without departing from the spirit of the invention as set forth in the appended claims.

I claim:

1. An embroidery frame, comprising stationary side bars connected at their ends, laterally movable side bars adapted to coöperate therewith and pivoted at one end thereof to swing at an angle thereto, a manually-operated cam device at one end of the frame for moving said movable bars toward the stationary bars, a like cam device connecting with the free ends of the movable side bars and disconnected from said stationary bars, and springs actuating said movable bars in return direction away from the stationary bars.

2. An embroidery frame, comprising stationary side bars connected at their ends, laterally movable side bars adapted to coöperate therewith and pivoted at one end thereof to swing at an angle thereto, a manually-operated cam device at one end of the frame for moving said movable bars toward the stationary bars, a like cam device connecting with the free ends of the movable side bars and disconnected from said stationary bars, springs actuating said movable bars in return direction away from the stationary bars, and means beyond the stationary bars for clamping the loose flaps of material extending therefrom in position away from said bars.

3. An embroidery frame, comprising stationary side bars connected at their ends, laterally movable side bars adapted to coöperate therewith and pivoted at one end thereof to swing at an angle thereto, a manually-operated cam device at one end of the frame for moving said movable bars toward the stationary bars, a like cam device connecting with the free ends of the movable side bars and disconnected from said stationary bars, springs actuating said movable bars in return direction away from the stationary bars, clamping members at the ends of the frame connected with the stationary bars, and coöperating end clamping members loosely mounted in the movable bars.

4. An embroidery frame, comprising stationary side bars connected at their ends, laterally movable side bars adapted to coöperate therewith and pivoted at one end thereof to swing at an angle thereto, a manually-operated cam device at one end of the frame for moving said movable bars toward the stationary bars, a like cam device connecting with the free ends of the movable side bars and disconnected from said stationary bars, springs actuating said movable bars in return direction away from the stationary bars, clamping members at the ends of the frame connected with the stationary bars, coöperating end clamping members loosely mounted in the movable bars, said end clamping members being movable longitudinally of the frame into engagement with the end-portions thereof between the stationary side bars, and means for simultaneously operating said coöperating end clamping members when the movable side bars are operated.

5. An embroidery frame, comprising parallel stationary side bars connected at their ends, a transverse shaft at one end of said stationary side bars, laterally movable side bars having at their ends oppositely-directed cam members slidably mounted upon said shaft and spring-actuated thereon in opening direction away from said stationary side bars, a double-ended cam member on said shaft between said first-named cam members and adapted to simultaneously operate said cam members in opposite directions on the shaft, an operating handle connected with said double-ended cam member, a shaft at the opposite ends of said movable side bars, oppositely-directed cam members connected with the last named ends of said movable side bars and slidably mounted on said last named shaft and spring-actuated thereon in opening direction away from the stationary side bars, a double-ended cam on said last-named shaft adapted to operate the said last-named cam members in closing direction, and an operating handle connected with said last-named cam member.

In testimony, that I claim the foregoing as my invention, I have signed my name in presence of two subscribing witnesses.

JOSEPH ROSCHACH.

Witnesses:
  F. Hogg,
  Jos. Bisband.

Copies of this patent may be obtained for five cents each, by addressing the "Commissioner of Patents. Washington, D. C."